INVENTORS
MASATOSHI YAMAGUCHI
FREDERICK R HOWARD
HARLAN K. PRATT

BY
ATTORNEY

United States Patent Office

3,459,032
Patented Aug. 5, 1969

3,459,032
MANOMETER CALIBRATING DEVICE AND METHODS
Masatoshi Yamaguchi, Frederick D. Howard, and Harlan K. Pratt, Davis, Calif., assignors to Roger Gilmont Instruments, Inc., Great Neck, N.Y., a corporation of New York
Filed July 6, 1967, Ser. No. 651,488
Int. Cl. G01l 27/00
U.S. Cl. 73—4    18 Claims

ABSTRACT OF THE DISCLOSURE

An assembly of a syringe and a specially designed substitute stopcock plug is used to replace the normal stopcock plug in a manometer, the syringe being placed in fluid communication with the manometer when the substitute plug is inserted into the stopcock socket, thereby to provide for accurate and invariant calibrating volume changes.

---

The present invention relates to a device specially designed to facilitate the accurate calibration of pressure measuring devices, such as monometers of the Warburg type, and to the manner in which such a device is used.

When manometers or other pressure measuring devices are used to measure small changes in pressure which occur in an attached chamber such as a flask, and when those pressure changes are to be indicative of volumetric changes, the precise relationship between a given volumetric change and the corresponding indicated pressure change must be known. This problem typically arises in connection with the use of Warburg-type manometers to which a test vessel is connected. A reaction, such as a biological experiment involving tissue respiration or photosynthesis, is carried out in that vessel and the extent to which a given reaction has progressed is determined by the degree to which a given gas is prouced or absorbed, thereby causing the pressure within the closed manometer system to vary correspondingly. The variation in gas pressure causes a change in the indication of the manometer, this indication is in one embodiment brought back to a reference value by manually changing the volume of the system, and the change of pressure is determined either by measuring the change of volume directly or by measuring the change in level of the manometer indicating fluid from one of its operative positions to the other. The overall volume of the closed manometer system, including the volume of the vessel in which the reaction takes place, will affect the relationship between a given change in volume and the indicated change in pressure. It is therefore necessary, before each experiment, and after a particular reaction vessel has been connected to the manometer, to calibrate the manometer.

Calibration is usually carried out by connecting an adjustable syringe to the manometer system after the reaction vessel has been operatively connected to that system, manipulating the syringe to vary the volume thereof by a known degree, and then determining the indicated pressure change which accompanies that known change in volume. In the past the syringe has been detachably connected to the end of the vent tube of the manometer system and the manometer stopcock has been manipulated to connect the vent tube to the pressure measuring system per se. The connection of a syringe to the system in this fashion alters the overall volume of the measuring system, and that change in volume affects the accuracy of the calibration. It therefore is necessary to determine the actual volume, usually called "static volume," which has been thus added to the system before calibration can be made. Since the connection of the syringe to the vent tube is by way of a flexible tube which is sealingly telescoped over the tip of the syringe and the tip of the vent tube, the actual location of the syringe relative to the manometer will vary from application to application depending upon the degree to which the rubber tube is slid over the parts to which it is attached. Hence the static volume of the calibrating device will not be constant, but must be determined each time that a syringe is attached, and this is a source of considerable time, trouble and possible inaccuracy. Moreover, because the connection between the syringe and the manometer vent tube is flexible, that static volume will vary somewhat in each installation depending upon the particular attitude in which the syringe is held, and since this attitude will unavoidably change inaccuracies in calibration are necessarily produced.

It is the prime object of the present invention to devise a device which will eliminate these disadvantages in the calibration of manometer systems, and which, in particular, will provide a known and invariant static volume effective each time that a given device is used. Hence once the static volume of a given device of the present invention has been determined, that static volume will be effective each time that the device is used, and no matter with how many different manometers a particular device may be used.

It is a further prime object of the present invention to produce a calibrating device which may be connected to and disconnected from a manometer system with far greater facility than has been possible heretofore.

In accordance with the present invention a syringe is physically integrated with a body adapted to be substituted for the conventional stopcock plug of a manometer system. Since the syringe and body are permanently associated, and since the incorporation of the assembly into the manometer system is accomplished with precision, the static volume of the syringe-body combination remains constant no matter how many times the device may be removed from and reinserted into the manometer system and no matter with how many different manometer systems the device may be used. Preferably the syringe and body are rigidly associated, so that no changes will occur in the static volume of the calibrating device such as were characteristic of the prior art rubber tube connections.

Since the stopcock sockets of different manometer systems, even when nominally of the same size, may differ somewhat in dimensions and shape, and since the bodies of the devices of the present invention are adapted to be inserted into such sockets, the precise position of a given body will differ when inserted into the sockets of slightly different sizes or shapes. It is, of course, essential that the syringe be in good fluid communication with the pressure-measuring portion of the manometer. Consequently it is preferred that the passage through the syringe-connected body of the present invention which is adapted to connect the syringe with the pressure measuring section of the manometer should have an exposed end which is somewhat elongated in the direction of insertion of the body into the stopcock socket. It is also preferred that the body of the device of the present invention be provided with a second passage which, when the body is appropriately rotated within the socket, is effective to vent the pressure measuring section of the manometer.

To the accomplishment of the above, and to such other objects as may hereinafter appear, the present invention relates to a device usable for calibrating a pressure measuring system such as a manometer and to the method of using same, as defined in the appended claims and as described in this specification, taken together with the accompanying drawings, in which:

Figure 1:
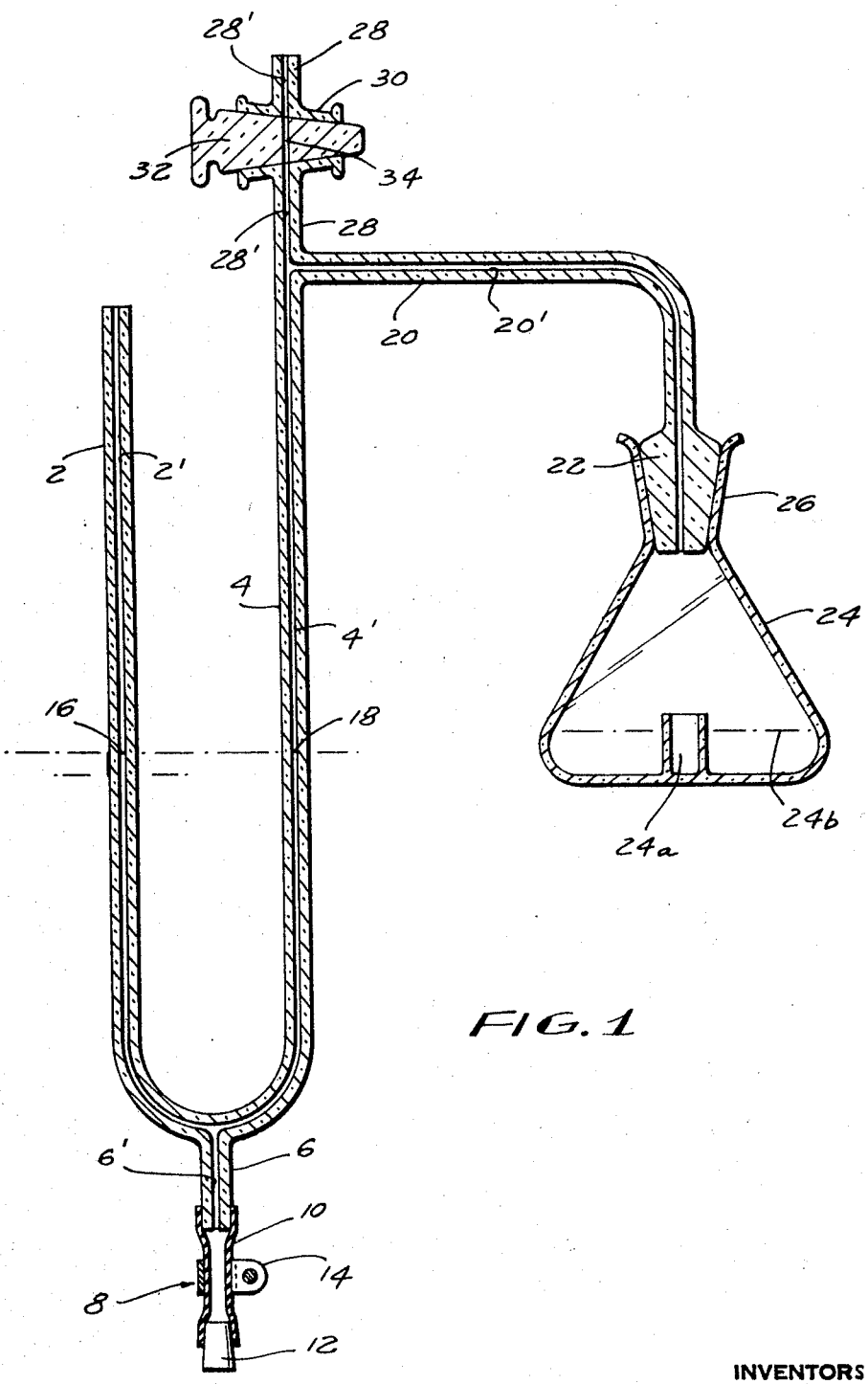
FIG. 1 is a cross sectional view on an enlarged scale of a typical Warburg-type manometer to which a typical reaction flask is attached, FIG. 1 thus illustrating a typical system with which the device of the present invention is adapted to be used.

FIG. 1 illustrates a typical manometer system, here shown specifically as one of the Warburg type, in connection with which the device of the present invention is particularly well adapted for use for calibration purposes. The manometer comprises a pair of vertical arms 2 and 4 connected at their lower ends to a depending arm 6, the arms being provided with communicating narrow bores 2′, 4′ and 6′ respectively. The bore 6′ is open at its lower end and an adjustable volume device generally designated 8 is attached thereto, that device being here shown for purposes of exemplification as a flexible tube 10 the lower end of which is sealingly closed by a plug 12 and the cross section of which is adjustable by means of a clamp 14 attached thereto. A suitable liquid such as mercury fills tube 10 and the bore 6′ and extends up into the bores 2′ and 4′ to a nominal level as indicated by the lines 16 and 18 in the bores 2′ and 4′ respectively. The bore 2′ is open to the atmosphere at the upper end of the arm 2. The bore 4′ communicates at its upper end with a bore 20′ in an arm 20 which extends laterally from the arm 4 and then extends downwardly and terminates in a tip 22, the bore 20′ being open at the bottom of the tip 22. A reaction flask 24 has a neck 26 which is adapted to be sealingly telescoped over the tip 22, thereby bringing the internal volume of the flask 24 into fluid communication with the bores 20′ and 4′.

The arm 4 has an upper extension 28 interrupted by a stopcock socket 30, the extension 28 having a pair of aligned bores 28′ above and below the socket 30 the lower one of which communicates with the bores 4′ and 20′ and the upper one of which is exposed at the tip of the arm 28. Rotatably received in the stopcock socket 30 is a conventional stopcock plug 32 having a passage 34 therethrough. When the stopcock plug 32 is in the rotative position shown in FIG. 1 the bore 34 connects the upper and lower bores 28′, thus venting the pressure measuring section of the manometer defined by the internal volume of the flask 24 and by the bores 20′ and 4′. When pressure measurement is to take place the stopcock 32 is rotated within the socket 30 so as to move the passage 34 out of registration with the bores 28′, thus sealing off and closing the aforementioned pressure measuring section. When that pressure measuring section was vented the pressure on the upper ends 16 and 18 of the liquid in bores 2′ and 4′ respectively was the same, so those upper ends 16 and 18 are at the same level. When the pressure measuring system is sealed off, however, and any change in pressure takes place therein, the upper ends of the liquid columns in the bores 2′ and 4′ will have different pressures exerted thereon and hence the levels of the liquids in those two bores will change, and to a degree determined by the difference in pressures exerted thereon. One level will rise and the other level will fall. Since it is often inconvenient to measure directly the difference between those two levels, it is customary to then adjust the clamp 14 so as to bring one of the levels back to its original nominal position, the other level shifting therewith and the height of the other level relative to said one level then being readable on a scale. In other instances, as in the compensated syringe manometer shown in copending application Ser. No. 635,847 of May 3, 1967, by Roger Gilmont entitled "Compensated Syringe Manometer" and assigned to the assignee of this application, an accurate syringe is employed in place of the clamp 14 in order to adjust the level of the liquid, the change in volume of the syringe needed to bring a given level back to nominal position being a measure of the pressure change.

If one is to accurately correlate a measured change of pressure to whatever it is that is going on within the reaction flask 24, the initial volume of the closed gas system in the manometer must be taken into account. The numerical value of that volume need not be known, but its effect in producing a given change in pressure for a given change in volume must be known. This is what is meant by calibrating the system. Not only do the volumes of nominally identical reaction flasks 24 differ one from the other, but the effective gas volumes of those flasks will differ depending upon how much of the reacting substance is placed within them, normally within the wells 24a. Frequently an absorbing reagent is placed in the bottom of the flask around the well 24a as indicated by the dotted line 24b, and the volume of such reagent will also affect the gas volume of the manometer. Typically the reagent in question may be water, but whatever it is, the amount of it which is present will affect the calibration of the device.

Figure 2:
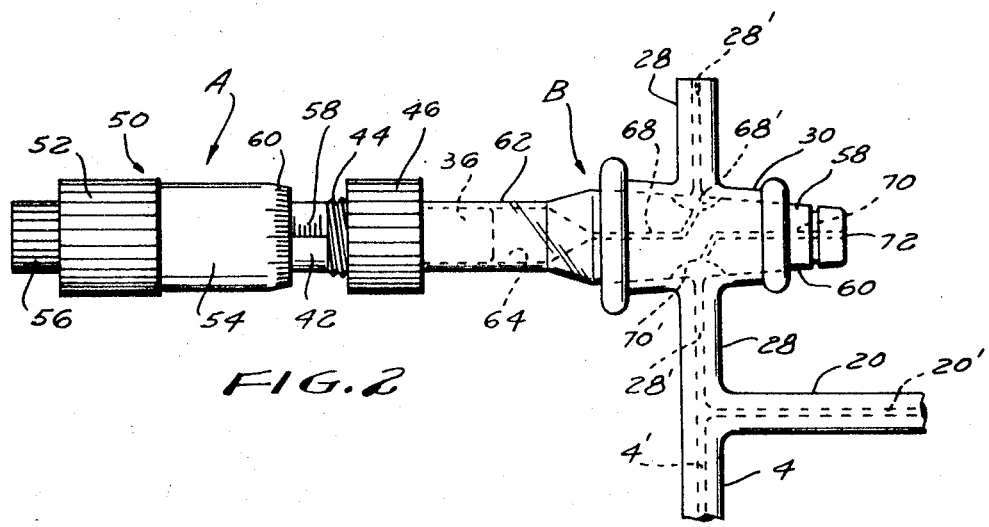
FIG. 2 is a side elevational view of the calibrating device of the present invention inserted in the stopcock socket of the manometer of FIG. 1, the device being shown in position such that the pressure measuring section of the manometer is vented.
Figure 3:
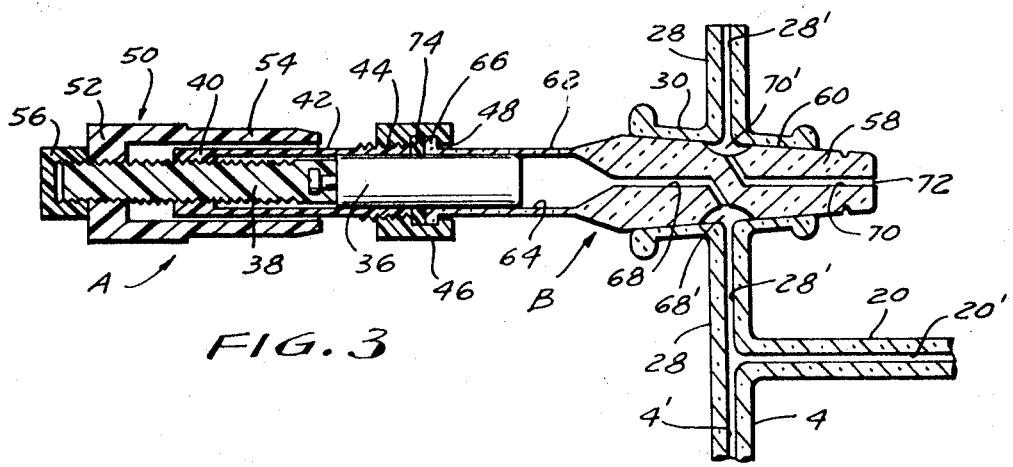
FIG. 3 is a side cross sectional view of the assembly of FIG. 2, but with the calibrating device rotated so that the syringe is brought into fluid communication with the pressure measuring section of the manometer.
Figure 4:
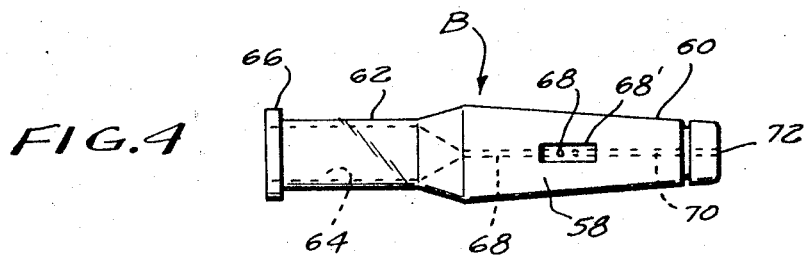
FIG. 4 is a top plan view of the substitute plug body of FIG. 2 with the syringe removed.

In accordance with the present invention, and as is shown in FIGS. 2–4, a calibrating device has been devised which consists of an accurately adjustable syringe generally designated A and a body generally designated B to which the syringe A is adapted to be secured, the body B being designed to be received within the stopcock socket 30 of the manometer in place of the normal stopcock plug 32 which has previously been removed therefrom.

The syringe A may take any desired form, but it is desirably light and simple to operate. It may be of the type disclosed in Gilmont Patent No. 3,232,117 of Feb. 1, 1966, entitled "Micrometer Buret," and it is here illustrated in that form. It comprises a plunger 36 secured to a rotary driving member 38 which in turn threadedly passes through the end wall 40 of a barrel 42, the piston 36 being slidable out through the open end of the barrel 42, that external end being externally threaded at 44 so as to receive a nut 46 thereon, the latter having an inwardly directed end flange 48. That portion of the driving member 38 which extends out beyond the end wall 40 of the barrel 42 is also externally threaded, and threadedly received thereon is a sleeve generally designated 50 having an internally threaded hub portion 52 and a depending skirt 54. A lock nut 56 is threadedly received on the outwardly projecting tip of the driving member 38 and is adapted to engage the hub portion 52 of the sleeve 50. The exposed surface of the barrel 42 and the edge of the sleeve 54 are provided with cooperating indicia 58 and 60 respectively in micrometer fashion.

The substitute stopcock plug element B comprises a tapered body portion 58 having a side wall 60, the body portion 58 being dimensionally a substantial duplicate of the corresponding stopcock plug 32, so that it may be inserted into the plug socket 30 once the conventional plug 32 has been removed therefrom. The body portion 58 is provided at one end with an extending portion 62, the inside of which is hollowed out to define a cylinder 64 within which the piston 36 is adapted to be received, the section 62 terminating in an outwardly directed flange 66. The body portion 58 is provided with a passage 68 which communicates between the chamber 64 and the body side wall 60 at a point corresponding to the locations of the bore sections 28′ in the upwardly extending arm 28 of the manometer. Because the precise dimensions and angularity of the inner surfaces of stopcock sockets 30 in different manometers may vary somewhat even though they are all nominally of the same size and shape, it is preferred that the end of the passage 68 which is open at the body side wall 60 be elongated in the direction of the axis of rotation of the body 58, as indicated at 68', thereby to ensure effective fluid communication between the passage 68 and a given manometer bore 28' despite such variations as might normally be expected in the fit of the body portion 58 within sockets 30 of slightly different sizes or shapes.

The body 58 is also preferably provided with a second passage 70 open at one end 72 to the atmosphere and open at its other end to the side portion 60 of the body portion 58, that latter end, designated 70', also preferably being elongated in the direction of the axis of rotation of the body portion 58 in the same fashion, and for the same reason, as the end 68' of the passage 68.

The syringe A is adapted to be mounted on the body B by means of the nut 46 as shown in FIG. 3, it being preferred that a sealing ring 74 of any appropriate composition be interposed between the tip of the barrel 42 and the flange 66 of the extension 62.

The calibrating device of the present invention, when inserted into the stopcock 30 as shown in FIGS. 2 and 3, is adapted to be used for calibration purposes as follows:

First the device is rotated to the position shown in FIG. 2 in which the passage 70 is brought into communication with the lower manometer bore 28'. This vents the measuring section 4', 20', 24 of the manometer, equalizing the pressure atop the two liquid arms 2' and 4'. Then the device of the present invention is rotated within the socket 30 to its position shown in FIG. 3, bringing the chamber 64 into fluid communication with said measuring section of the manometer and sealing off that section from the atmosphere. Next the skirt 54 is rotated so as to cause the piston 36 to move within the chamber 64 to a predetermined and known extent, thereby producing a known change in volume. This will cause a change in pressure in the measuring section of the manometer, and that change in pressure, reflected in a difference in the levels which the liquid in the arms 2' and 4' take, is measured in conventional fashion. Since the change in volume is known and the change in pressure is known, calibration is possible.

Since the syringe A and body B are readily connected to one another, and since the body B is rigidly connected to the manometer system without the use of any flexible or variable length connecting elements, the calibrating device in question will always have the same effect on a manometer when similarly manipulated insofar as change in volume is concerned, and its static volume—the volume of the chamber 64 and of the passage 68 with the piston 36 in a given position—when once determined, will necessarily remain constant for every time that a given device is used.

Because the sleeve 50 is adjustably mounted on the driving element 38 of the syringe A its zero indication point may be changed to correspond to any desired position of the piston 36 relative to the barrel 42. Hence the static volume of a given device of the present invention can be adjusted so as to correspond to a desired volume, such as that of a standard pipet, thus facilitating use of the device in question with systems where such standard volumes of reagents are adapted to be placed within the reaction flasks 24.

Another advantage of the present invention has to do with the rapidity, ease and security with which the calibrating device may be attached to and detached from the manometer system. All that is necessary is to remove the conventional stopcock plug 32 and insert the tapered body portion 58 in its place, and after calibration the procedure is reversed to render the manometer ready for measuring.

The body portion 58 may, like the conventional stopcock plug 32, be formed of glass. The operative parts of the syringe A may be formed of plastic, thereby to reduce the weight of the syringe and thus make the calibrating device easier to handle.

While but a single embodiment of the present invention has been here specifically disclosed, it will be appreciated that many variations may be made therein, all within the spirit of the invention as defined in the following claims.

We claim:

1. In combination, a body adapted to be rotatably received in a stopcock socket and having a side wall adapted to be covered by said socket when said body is received therein and a portion adapted to be exposed by said socket when said body is received therein, said body having a passage therethrough open at one end at said exposed body portion and open at its other end at said body side wall, and an adjustable syringe secured to said body and in operative fluid communication with said body passage via said one passage end.

2. The combination of claim 1, in which said syringe is rigidly mounted on said body at said exposed body portion.

3. The combination of claim 2, in which said other end of said passage is elongated in the direction of the axis of rotation of said body.

4. The combination of claim 2, in which said body has a venting passage therethrough isolated from said first named passage, said venting passage being open at one end to the atmosphere and open at its other end at said body side wall.

5. The combination of claim 2, in which said body has a venting passage therethrough isolated from said first named passage, said venting passage being open at one end at the end of said body opposite the exposed end portion thereof and open at its other end at said body side wall.

6. The combination of claim 2, in which said one end of said passage terminations in an enlarged chamber and said syringe comprises a movable piston received in said chamber so as to be movable therealong to vary the effective volume thereof.

7. The combination of claim 2, in which said syringe is provided with indicating means for showing the operative volumetric condition of said syringe, said indicating means having a zero point, and means for shifting said indicating means so as to very the indicated zero point thereof.

8. The combination of claim 2, in which said body has a venting passage therethrough isolated from said first named passage, said venting passage being open at one end to the atmosphere and open at its other end at said body side wall, said one end of said first named passage terminates in an enlarged chamber, and said syringe comprises a movable piston received in said chamber so as to be movable therealong to vary the effective volume thereof.

9. The combination of claim 1, in which said other end of said passage is elongated in the direction of the axis of rotation of said body.

10. The combination of claim 9, in which said one end of said passage terminates in an enlarged chamber and said syringe comprises a movable piston received in said chamber so as to be movable therealong to vary the effective volume thereof.

11. The combination of claim 9, in which said syringe is provided with indicating means for showing the operative volumetric condition of said syringe, said indicating means havng a zero point, and means for shifting said indicating means so as to vary the indicated zero point thereof.

12. The combination of claim 1, in which said body has a venting passage therethrough isolated from said first named passage, said venting passage being open at one end to the atmosphere and open at its other end at said body side wall.

13. The combination of claim 12, in which said one end of said first named passage terminates in an enlarged chamber and said syringe comprises a movable piston received in said chamber so as to be movable therealong to vary the effective volume thereof.

14. The combination of claim 1, in which said body has a venting passage therethrough isolated from said first named passage, said venting passage being open at one end at the end of said body opposite the exposed end portion thereof and open at its other end at said body side wall.

15. The combination of claim 1, in which said one end of said passage terminates in an enlarged chamber and said syringe comprises a movable piston received in said chamber so as to be movable therealong to vary the effective volume thereof.

16. The combination of claim 1, in which said syringe is provided with indicating means for showing the operative volumetric condition of said syringe, said indicating means having a zero point, and means for shifting said indicating means so as to vary the indicated zero point thereof.

17. The method of calibrating a Warburg manometer or the like having a stopcock comprising a socket and a stopcock plug rotatably received therein, said manometer having a passage extending from a wall of said socket to the pressure-measuring section of said manometer, said method comprising removing said stopcock plug from said stopcock socket, sealingly inserting into said socket, a body having a side wall adapted to be covered by said socket when said body is received therein and a portion adapted to be exposed by said socket when said body is received therein, said body having a passage therethrough open at one end at said exposed body portion and open at its other end at said body side wall, an adjustable syringe being secured to said body and in said operative fluid communication with said body passage via said one passage end, rotating said body in said socket to bring said one end of said body passage into registration with said manometer passage, adjusting said syringe so as to vary the volumetric status thereof to known degree, and reading on said manometer the corresponding change in pressure.

18. The method of claim 17, in which said body has a venting passage therethrough isolated from said first named passage, said venting passage being open at one end to the atmosphere and open at its other end at said body side wall, the additional step of rotating said body in said socket at a desired time to bring said second body passage into registration with said manometer passage, thereby to vent said pressure-measuring section of said manometer.

References Cited

UNITED STATES PATENTS

| | | | |
|---|---|---|---|
| 1,684,171 | 9/1928 | Davis | 222—434 XR |
| 2,258,276 | 10/1941 | Boettler et al. | |
| 2,277,760 | 3/1942 | Hoffman et al. | 73—401 XR |
| 2,968,535 | 1/1961 | Arthur et al. | 23—253 |
| 3,012,863 | 12/1961 | Feichtmeir | 23—253 |
| 3,347,634 | 10/1967 | Brown | 23—253 XR |

LOUIS R. PRINCE, Primary Examiner

JEFFREY NOLTON, Assistant Examiner

U.S. Cl. X.R.

23—253; 73—149; 251—208